(12) United States Patent
Saint-Dizier (10) Patent No.: US 9,279,357 B2
(45) Date of Patent: Mar. 8, 2016

(54) DOUBLE-WALLED EXHAUST VOLUME AND CORRESPONDING MANUFACTURING METHOD

(71) Applicant: Faurecia Systemes D'Echappement, Nanterre (FR)

(72) Inventor: Serge Saint-Dizier, Valentigney (FR)

(73) Assignee: Faurecia Systemes D'Echappement, Nanterre (FR)

(*) Notice: Subject to any disclaimer, the term of this patent is extended or adjusted under 35 U.S.C. 154(b) by 145 days.

(21) Appl. No.: 13/740,623

(22) Filed: Jan. 14, 2013

(65) Prior Publication Data

US 2013/0180234 A1 Jul. 18, 2013

(30) Foreign Application Priority Data

Jan. 16, 2012 (FR) ...................................... 1250403

(51) Int. Cl.
*F01N 3/00* (2006.01)
*F01N 3/02* (2006.01)
(Continued)

(52) U.S. Cl.
CPC ................ *F01N 13/08* (2013.01); *F01N 3/046* (2013.01); *F01N 13/102* (2013.01); *F01N 13/18* (2013.01); *F01N 13/1805* (2013.01); *F01N 13/1872* (2013.01); *F16L 13/116* (2013.01);
(Continued)

(58) Field of Classification Search
CPC ....... B23K 31/00; F01N 13/08; F01N 13/102; F01N 13/18; F01N 13/1805; F01N 13/1872; F01N 3/046; F01N 13/141; F01N 2540/22; F01N 2470/24; F16L 39/005; Y02T 10/20

USPC ....................... 60/323, 324; 285/331, 137.11, 285/139.1–139.3, 400, 408, 412–404
See application file for complete search history.

(56) References Cited

U.S. PATENT DOCUMENTS 1,090,970 A * 3/1914 Butler ........................... 285/331
3,864,908 A * 2/1975 LaHaye ......................... 60/272
(Continued)

FOREIGN PATENT DOCUMENTS

DE 4107539 A1 9/1992
DE 199 38 359 * 2/2001 ................ F01N 7/10
(Continued)

OTHER PUBLICATIONS

Machine Translation DE 199 38 359 Done Jun. 22, 2015.*
French Search Report issued Nov. 8, 2012 for FR Application No. 1250403, filed Jan. 16, 2012.

*Primary Examiner* — Audrey K Bradley
*Assistant Examiner* — Dapinder Singh
(74) *Attorney, Agent, or Firm* — Carlson, Gaskey & Olds, PC (57) ABSTRACT

An exhaust volume for combustion gases from a motor vehicle engine comprises at least one exhaust duct delimited by a wall comprising an end segment, and at least one flange having a bearing surface. The flange delimits at least one exhaust gas inlet communicating with the exhaust duct. The exhaust gas inlet is delimited by a cannon connected to the flange, with the cannon being attached to the end segment. At least one outer neck is attached to the end segment. The end segment is arranged between the flange and the outer neck, with the end segment being pierced with at least one hole between the flange and the outer neck. The end segment, the flange, and the outer neck are being secured through the addition of a filler.

30 Claims, 6 Drawing Sheets (51) Int. Cl.
  *F01N 3/10* (2006.01)
  *F01N 3/20* (2006.01)
  *F01N 13/08* (2010.01)
  *F01N 13/18* (2010.01)
  *F01N 3/04* (2006.01)
  *F01N 13/10* (2010.01)
  *F16L 13/11* (2006.01)
  *F01N 13/14* (2010.01)

(52) U.S. Cl.
  CPC .......... *F01N 13/141* (2013.01); *F01N 2450/22* (2013.01); *F01N 2470/24* (2013.01); *Y02T 10/20* (2013.01); *Y10T 29/49398* (2015.01)

(56) References Cited

U.S. PATENT DOCUMENTS

| | | | |
|---|---|---|---|
| 5,761,905 A * | 6/1998 | Yamada et al. | 60/322 |
| 6,055,806 A * | 5/2000 | Dalton | 60/272 |
| 6,155,045 A * | 12/2000 | Durr et al. | 60/323 |
| 2007/0289954 A1 | 12/2007 | Bien | |

FOREIGN PATENT DOCUMENTS

| | | |
|---|---|---|
| EP | 1336810 A2 | 8/2003 |
| GB | 2309491 A | 7/1997 |
| WO | 0116468 A1 | 3/2001 |
| WO | 2010019268 A1 | 2/2010 |

* cited by examiner

DOUBLE-WALLED EXHAUST VOLUME AND CORRESPONDING MANUFACTURING METHOD

CROSS-REFERENCE TO RELATED APPLICATIONS

This application claims priority to FR application No. 12 50403, filed Jan. 16, 2012.

TECHNICAL FIELD

The present invention generally relates to exhaust volumes for motor vehicles.

More specifically, according to a first aspect, the invention relates to an exhaust volume comprising at least one exhaust duct delimited by a wall comprising an end segment; and at least one flange having a bearing surface. The flange delimits at least one exhaust gas inlet communicating with the exhaust duct, and the exhaust gas inlet is delimited by a cannon connected to the flange, with the cannon being attached to the end segment.

BACKGROUND OF THE INVENTION

Such an exhaust volume is known from the patent application filed under no. FR 11 59216. This application describes an exhaust manifold in which waves can be arranged easily. The manifold described in that application comprises an exhaust duct and a flange, the flange including a cannon made up of a first segment extended by a second segment that is not as thick as the first segment, and is connected to the wall of the exhaust duct. The second segment of the flange and the wall of the exhaust duct are typically secured to one another by brazing. The wall of the exhaust duct covers the second segment over the entire height of said second segment. Due to the large size of the overlap, brazing allows a particularly strong connection of the first and second cannons to one another. However, patent application no. FR 11 59216 does not describe how to connect the duct to the cannon when the cannon is enclosed in a double cooling jacket, or more generally an outer neck.

SUMMARY OF THE INVENTION

An exhaust volume as described below makes it possible to resolve the aforementioned problem.

The exhaust volume for the combustion gases from a motor vehicle engine of the aforementioned type comprises at least one outer neck attached to the end segment. The end segment is arranged between the flange and the outer neck. The end segment is pierced with at least one hole between the flange and the outer neck The end segment, the flange, and the outer neck are secured through the addition of a filler.

In this way, it is possible to obtain a solid and strong connection between the cannon, the outer neck, and the duct. In fact, the filler metal first infiltrates an inner side of the duct, in an interstice located between the duct and the cannon; it then infiltrates the hole, then an outer side of the duct, in an interstice located between the duct and the outer neck. In this way, the hole allows easy passage from the inner side to the outer side, between the two interstices. It is thus easier to secure the flange, the end segment, and the outer neck.

The exhaust volume is for example an exhaust manifold. Alternatively, the exhaust volume is a member for purifying exhaust gases, or a muffler.

Typically, the exhaust volume is an element of the hot part of the exhaust line.

Advantageously, the hole is formed in the end segment of the wall of the exhaust duct. For example, the hole is cylindrical and has an oval or oblong section. The section, for example, has a diameter several millimeters long.

Alternatively, several holes are distributed around the end segment.

The flange is typically shared by all of the exhaust gas inlets, as described in patent application no. FR 11 59216. It thus delimits a plurality of exhaust gas inlets, at least one for each exhaust gas outlet of the engine block.

Alternatively, the exhaust volume has several flanges, for example one for each exhaust gas outlet of the engine block.

In all cases, each flange is a plate with a small thickness, made from a metal material. This material is typically stainless steel, for example austenitic steel. Each flange has a thickness between 1 and 4 mm, for example 2.5 mm.

Each flange is typically pressed by its bearing surface against the engine block, directly or with an inserted seal. Each exhaust gas inlet is placed across from an exhaust gas outlet formed in the engine block, through which the gases coming from the various combustion chambers of the engine escape.

Alternatively, each flange may be pressed against another element of the exhaust circuit.

The cannon is formed in the flange, in that the cannon is integral with the flange. Alternatively, the cannon may be connected to the flange by a connector. The cannon, for example, has a generally cylindrical shape, typically with a circular section.

The flange includes a substantially planar portion, for example pressed against the engine block, in which the inlet is pierced. The cannon protrudes relative to the planar portion, from a side of the planar portion opposite the engine block or the element of the exhaust circuit. The cannon has a central axis substantially perpendicular to the planar portion of the flange.

The filler is typically added by brazing.

The wall of the exhaust duct has an end segment. The end segment is, for example, integral with the wall of the exhaust duct. Alternatively, the end segment may be connected to the wall of the exhaust duct by a connector.

The end segment preferably has a flared end. The concave portion of the flared end is arranged on the side opposite the exhaust duct, the convex portion being turned toward the inside of the exhaust duct.

The outer neck bears on the flared end of the end segment. More specifically, the outer neck rests on the concave portion of the flared end.

Furthermore, the cannon includes a first segment extended by a second segment with a smaller thickness than the first segment, the cannon having a shoulder between the first and second segments, the flared end bearing on the shoulder.

The thickness of the second segment is, for example, comprised between 0.5 mm and 3 mm, and is preferably equal to 1.25 mm.

In this way, the outer neck rests on the flared end of the wall of the exhaust duct, with the flared end in turn resting on the shoulder of the flange. In this way, proper positioning of the parts is ensured. Furthermore, this feature allows an allowance over the total length of the exhaust volume.

Furthermore, the first segment is inserted between the second segment and the planar portion. The second segment is arranged toward the exhaust duct relative to the first segment.

Furthermore, due to the smaller thickness of the second segment, the heating necessary to infiltrate the filler metal is reduced, such that the risk of deforming the bearing surface of the flange during that step is reduced. It is very important to preserve the flatness of the bearing surface to allow proper fastening of the flange.

The end segment, the second segment, and the outer neck advantageously have substantially the same thickness. Thus, the heating due to the brazing does not cause an interstice between the different parts of the exhaust volume.

The radial spacing between the end segment and the outer neck is smaller than 0.2 mm. Furthermore, the radial spacing between the end segment and the second segment is comprised between 0.05 mm and 0.45 mm. "Radial spacing" refers to the radial distance separating the outer neck from the end segment on the one hand, and the radial distance separating the second segment from the flange and the end segment on the other hand. These small radial spacing values allow better strength of the exhaust volume, and better sealing. This is particularly important when the outer neck is part of a double circulation enclosure for a cooling fluid. This in particular results from the fact that these three parts—outer neck, cannon, duct—have substantially the same thickness. The fact that the cannon has a second segment with a smaller thickness is advantageous in this context, since the heating necessary to infiltrate the filler metal is reduced.

As described above, the outer neck and the flange form a double enclosure delimiting a space provided for the circulation of the coolant liquid.

The double enclosure includes an outer wall substantially parallel to the flange and an outer neck for each duct, which is upright relative to the outer wall. The outer neck is placed around the corresponding duct. The outer neck is coaxial to the exhaust duct.

The cooling liquid is, for example, water or air.

The securing by brazing as previously described then prevents any leakage of the cooling liquid, and gives the exhaust volume excellent sealing.

According to a second aspect, a method for manufacturing an exhaust manifold having the aforementioned characteristics includes the following steps: deforming the outer neck; piercing a hole in the end segment; positioning the inlet of the exhaust duct across from the flange; and securing the flange, the end segment, and the outer neck by adding a filler.

According to this technique, the outer neck is deposited against a die with a hollow shape having rounded edges corresponding to an intermediate shape of the outer neck to be produced. The outer neck is deformed using a punch. The punch is pressed against the rounded edge of the die, at the inlet of the hollow portion. The punch is inserted into the hollow portion of the die and therefore makes it possible to give the neck its intermediate shape. Under the effect of the pressure applied by the punch, the outer neck deforms and bends. In this way, the outer neck adopts a substantially rounded shape, the edge of the die being inclined by approximately 45° relative to the horizontal plane.

The flange is formed according to the flange formation step described in patent application no. FR 11 59216.

The end segment of the wall of the exhaust duct is then pierced. This step is carried out using a die and a punch with different shapes from the die and the punch used in the steps for deforming the outer neck. The die has substantially the same diameter as the exhaust duct. The die is inserted inside the exhaust duct, at the end segment. A punch is then placed outside the wall of the exhaust duct, at the end segment, across from the die. Under the effect of the pressure exerted on the punch, the end segment is pierced and then forms a hole.

The inlet of the exhaust duct is positioned across from the flange. In this way, the flared end of the wall of the exhaust duct is across from the shoulder of the flange such that the flared end can rest on the flange.

The flange, the end segment, and the outer neck are secured by adding a filler. A heating mechanism is arranged inside the exhaust duct, at the end segment of the wall of the exhaust duct. The filler material is brought to the inlet of the interstice situated between the flange and the end segment. Under the effect of the heat, the filler melts and infiltrates the interstice.

Thus, the filler is first inserted between the flange and the end segment, then into the hole, then between the end segment and the outer neck.

The method may also include the following steps: forming the flared end; and pre-positioning the flared end on the outer neck.

BRIEF DESCRIPTION OF THE DRAWINGS

Other features and advantages of the invention will emerge from the following detailed description provided below, for information and non-limitingly, in reference to the appended Figures, in which.

DETAILED DESCRIPTION

Figure 1:
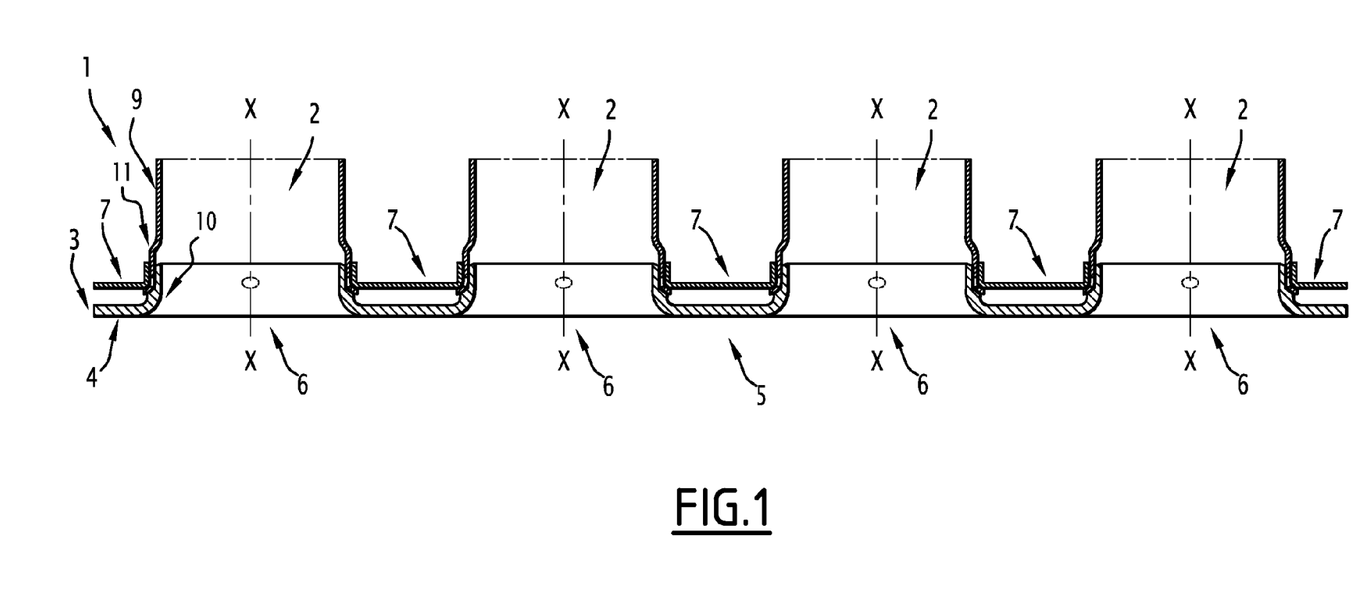
FIG. 1 is an axial cross-sectional view of the exhaust volume according to the invention.

The manifold 1 shown in FIG. 1 is provided to collect the exhaust gases coming from the outlets of the combustion chambers of the engine 5, also called the engine block. The manifold 1 comprises: a plurality of exhaust ducts 2; a flange 3 having a bearing surface 4 provided to be pressed against the engine 5, the flange delimiting a plurality of exhaust gas inlets 6; a plurality of outer necks 7; and an exhaust gas outlet (not shown) in communication with the exhaust ducts 2.

The exhaust ducts 2 guide the exhaust gases from the inlets 6 to the outlet. They each include a tubular wall 9. The tubular wall 9 delimits a circulation passage for the exhaust gases from the inlets 6 to the outlet.

The upstream portions of the ducts 2 are substantially rectilinear, and perpendicular to the bearing surface 4 of the flange. The ducts 2 extend around the longitudinal axis X shown in FIG. 1. The axis X is substantially perpendicular to the bearing surface 4.

The wall 9 is made from stainless steel, for example austenitic steel.

The flange 3 is a planar plate, made from stainless steel, for example austenitic steel. The inlets 6 are formed in the flange 3.

The flange 3 is arranged such that the inlets 6 are placed to coincide with the exhaust gas outlets.

Figure 2:
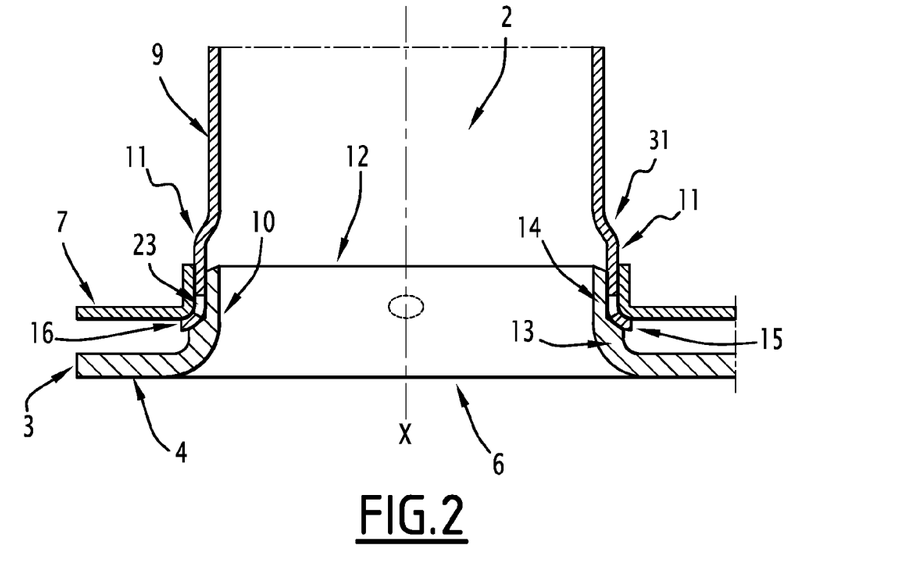
FIG. 2 is an enlarged cross-sectional view of part of the exhaust volume of FIG. 1.

As shown in FIG. 2, each inlet 6 is delimited by a cannon 10 formed in the flange 3. The cannon 10 protrudes relative to the flange 3 toward the duct 2, i.e. opposite the bearing surface 4.

Furthermore, the duct 2 has an inlet opening 12, the wall 9 having an end segment 11 delimiting the inlet opening 12. The inlet opening 12 is positioned across from the corresponding exhaust gas inlet 6.

The end segment 11 has a diameter slightly larger than the diameter of the duct 2. In this way, the wall 9 and the cannon 10 are in the extension of one another. This difference in diameter reveals an outer shoulder 31.

Each end segment 11 cooperates with the cannon 10 of the corresponding inlet to delimit a sealed passage for the exhaust gases from the inlet 6 to the corresponding inlet opening 12.

As illustrated in FIG. 2, the end segment 11 has a wall thickness substantially equal to the thickness of the wall 9. Considered in cross-section perpendicular to the central axis X of the inlet 6, the segment 11 has a substantially circular section.

The end segment 11 has a flared end 16. The concave portion of the flared end 16 is arranged on the side opposite the duct 2, the convex portion being turned toward the inside of said duct 2.

As shown in FIG. 2, the outer neck 7 is positioned bearing on the flared end 16 of the end segment 11.

Furthermore, the end segment has a hole 23 situated between the outer neck 7 and the flange 3.

Furthermore, the cannon 10 comprises a first segment 13 with a larger thickness toward the flange 3, extended by a second segment 14 having a smaller thickness toward the duct 2.

The first segment 13 has substantially the same thickness as the flange 3.

The second segment 14 has a thickness substantially corresponding to the thickness of the wall 9.

The first and second segments 13 and 14 are connected to one another by a shoulder 15. The shoulder 15 delimits an annular surface, substantially perpendicular to the longitudinal axis X of the inlet 6.

In this way, the outer neck 7 rests on the flared end 16 of the wall of the duct 2, with the flared end 16 in turn resting on the shoulder 15 of the flange 3.

The method for manufacturing the exhaust volume described above will now be explained, in reference to FIGS. 3, 4, 5, 6, 7 and 8.

The method comprises the following steps: deforming the outer neck; piercing a hole in the end segment; positioning the inlet of the exhaust duct across from the flange; and securing the flange, the end segment, and the outer neck by adding a filler.

Figure 3:
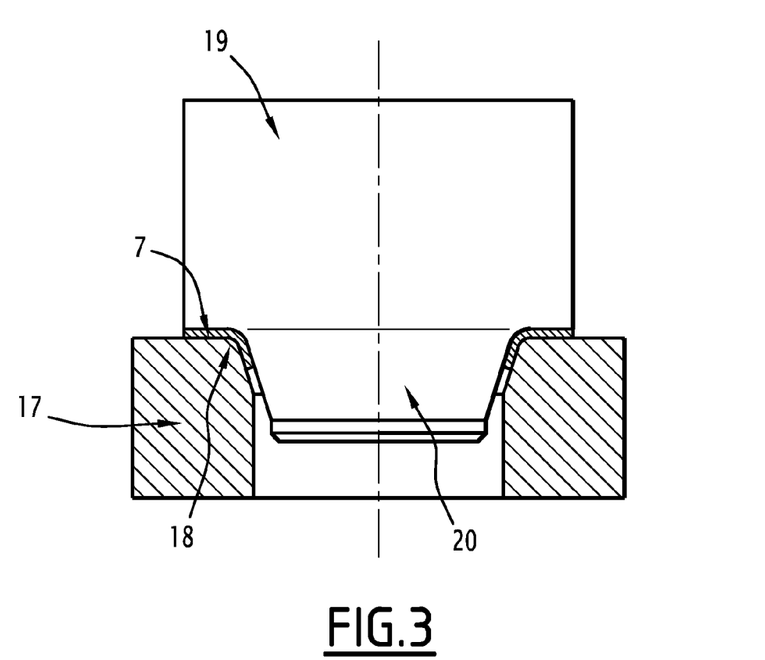
FIG. 3 is a diagrammatic illustration of the step for deforming the outer neck.

The step for deforming the outer neck 7 is illustrated in FIG. 3.

This step is carried out by punching using a die 17 and a punch 19. The die 17 has a hollow shape and has rounded edges 18. The punch 19 has a substantially tapered portion 20. The neck is positioned on the rounded edge 18 of the die 17. The punch 19 is pressed at the inlet of the hollow portion against the rounded edge 18 of the die 17, then is inserted into the hollow portion of the die 17 and makes it possible to give the neck an intermediate shape. Under the effect of the pressure applied by the punch 19, the outer neck 7 deforms and folds to reach its intermediate shape.

Figure 4:
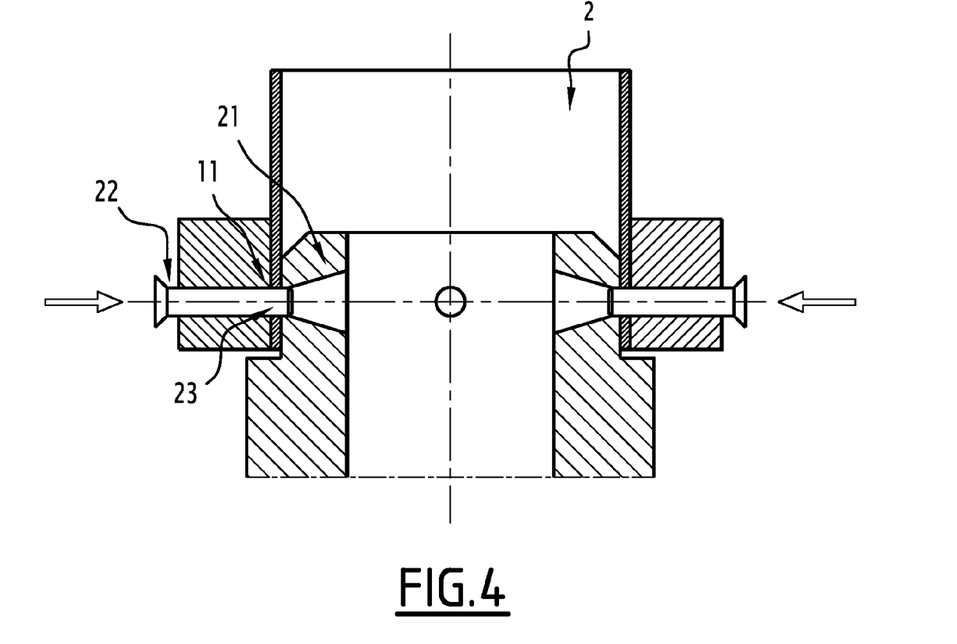
FIG. 4 is a diagrammatic illustration of the steps for piercing the hole in the end segment.

FIG. 4 illustrates the step for piercing a hole in the end segment.

This step is carried out using a die 21 and a punch 22 with shapes different from the die 17 and the punch 19 used in the step for deforming the outer neck 7.

The die 21 has substantially the same diameter as the duct 2. The die 21 is inserted inside the duct 2, at the end segment 11.

The punch 22 is positioned outside the duct 2, in contact with the outer side of the wall. The punch 22 is placed at the height of the end segment 11, across from the die 21.

Pressure is exerted radially on the punch 22 toward the inside of the duct 2. Under the effect of that pressure, the end segment 11 is pierced and forms the hole 23.

Figure 5:
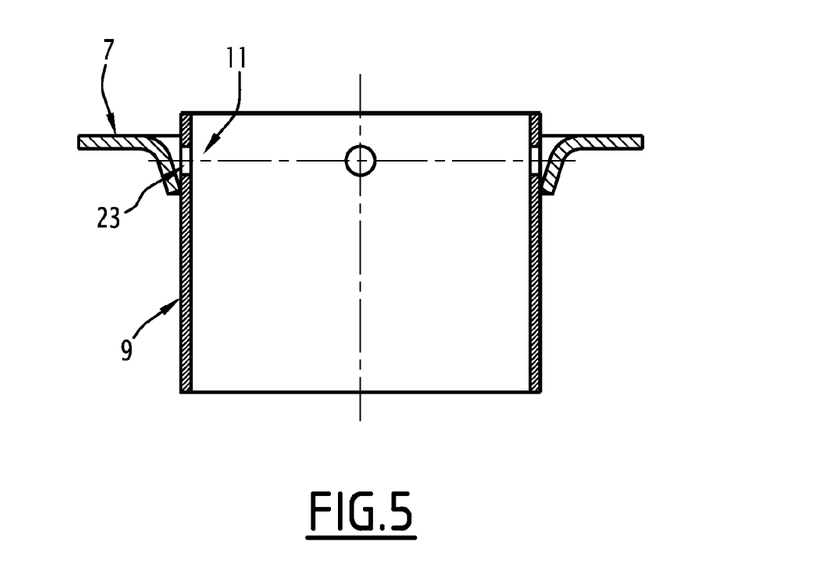
FIG. 5 is a diagrammatic illustration of the step for pre-positioning the flared end on the outer neck.

The method includes a step for pre-positioning the flared end 16 on the outer neck 7. This step is shown in FIG. 5. The outer neck 7 is positioned against the wall 9, at the end segment 11, across from the hole 23.

Figure 6:
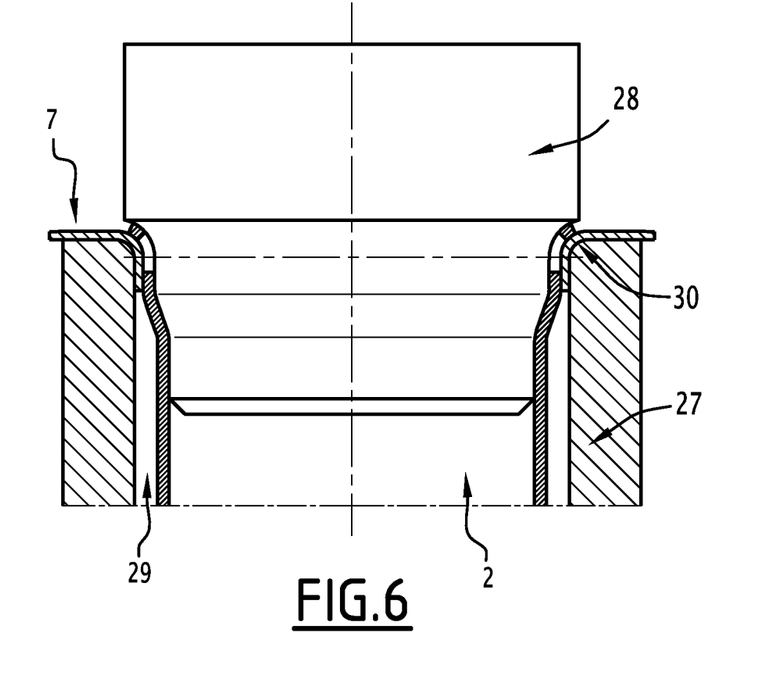
FIG. 6 is a diagrammatic illustration of the step for forming the flared end.

The method also includes a step for forming the flared end illustrated in FIG. 6.

This step is also carried out with a die 27 cooperating with a punch 28.

The die 27 has an opening 29. The die 27 also comprises rounded edges 30 designed to give the outer neck 7 its final shape.

The punch 28 has an irregular diameter. The head of the punch 28 has a diameter corresponding to the diameter of the duct 2. The shape of the remaining portion of the punch is conjugated with the shape of the and segment 11 and the flared end 16.

The outer neck 7 and the end segment 11 deform under the effect of the pressure applied by the punch. The outer neck 7 adopts a rounded shape, the edge of the die being inclined at approximately 90° relative to the horizontal plane. The end segment 11 adopts its final shape revealing the bend of the flared end 16.

Figure 7:
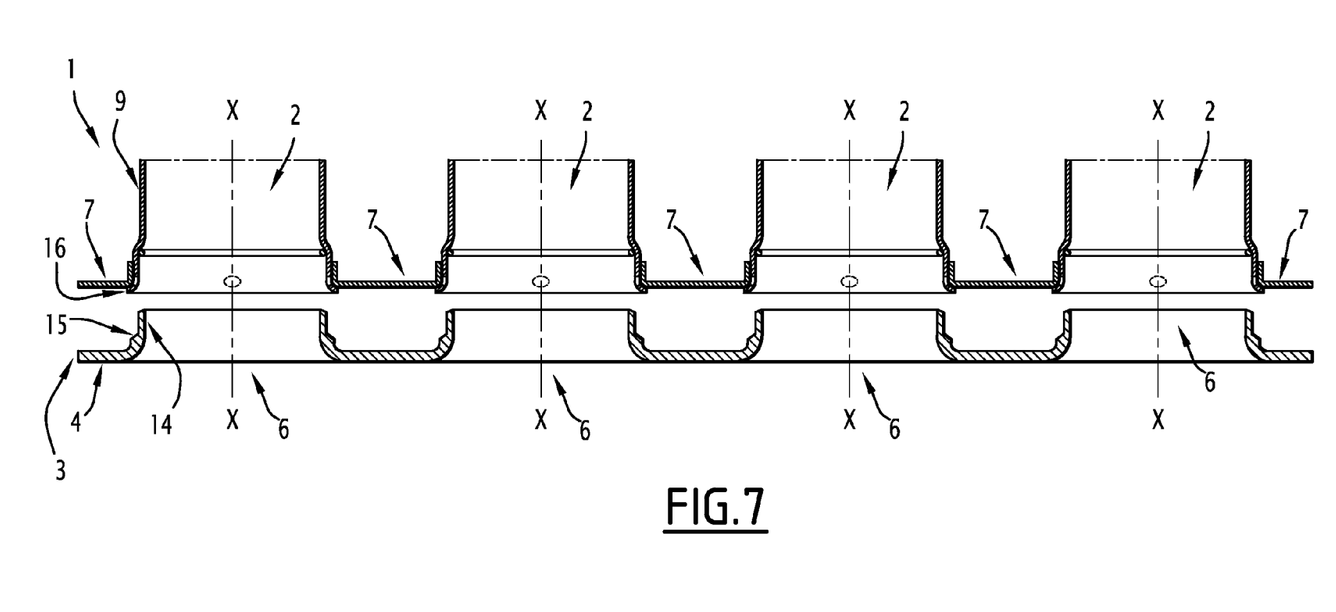
FIG. 7 is a diagrammatic illustration of the step for positioning the inlet of the exhaust duct across from the flange.

FIG. 7 illustrates the steps for positioning the inlet of the duct 2 across from the flange 3.

The positioning of the duct 2 across from the flange 3 is done such that the flared end 16 faces the shoulder 15 such that said flared end 16 can rest on said shoulder 15.

Furthermore, the duct 2 and the flange 3 are positioned such that the hole 23 is situated between the second segment 14 and the outer neck 7.

Figure 8:
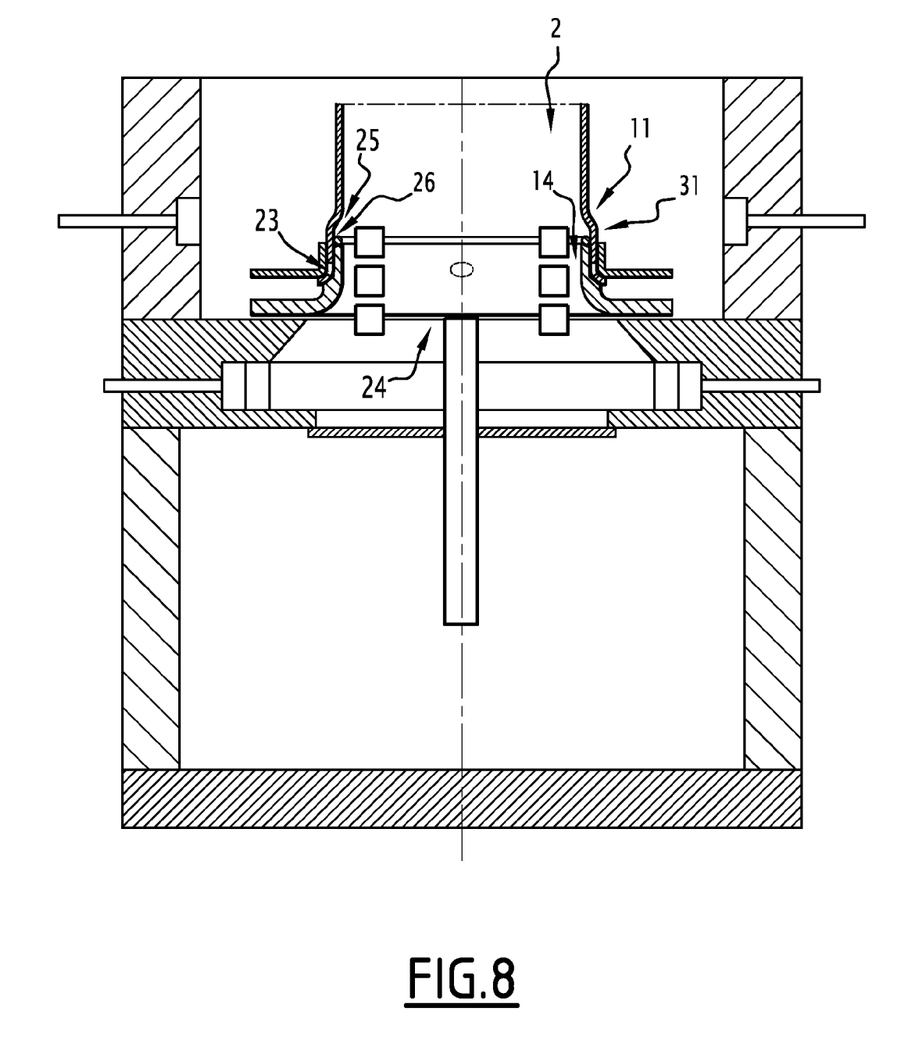
FIG. 8 is a diagrammatic illustration showing the steps for securing the flange, the end segment and the outer neck.

The step for securing the flange 3, the end segment 11, and the outer neck 7 is shown in FIG. 8. This step may for example be carried out under a protective gas.

A heating mechanism 24 is arranged inside the duct 2, at the end segment 11. The filler material 25 is brought to the inlet of the interstice 26 situated between the second segment 14 and the end segment 11. The filler material 25 is housed on an inner side of the duct 2, against the shoulder 31 situated between the inlet opening 12 and the wall 9. The filler material 25, for example, assumes the form of a solid ring. Under the effect of the heat, the filler material 25 melts and infiltrates the interstice 26. The filler material 25 infiltrates between the flange 3 and the end segment 11, in the hole 23, then between the end segment 11 and the outer neck 7.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust component for combustion gases coming from a motor vehicle engine comprising:
   at least one exhaust duct delimited by a wall comprising an end segment;
   at least one flange having a bearing surface, the flange delimiting at least one exhaust gas inlet communicating with the exhaust duct, the exhaust gas inlet being delimited by a cannon connected to the flange, the cannon being attached to the end segment; and at least one outer neck attached to the end segment, wherein the end segment is arranged between the flange and the outer neck, the end segment being pierced with at least one hole between the flange and the outer neck, and the end segment, the flange, and the outer neck being secured through the addition of a filler material;

an interstice between the cannon and the end segment is tubular and separates the cannon from the end segment radially with respect to a central axis of the exhaust gas inlet; and an interstice between the end segment and the outer neck is tubular and separates the cannon from the end segment radially with respect to a central axis of the exhaust gas inlet, and wherein the filler material is infiltrated between the flange and the end segment of the exhaust duct, through the hole, and in the interstice between the end segment and the outer neck.

2. The exhaust component according to claim 1, wherein radial spacing between the end segment and the outer neck is smaller than 0.2 mm.

3. The exhaust component according to claim 1, wherein the outer neck and the flange form a double enclosure delimiting a space provided for circulation of a coolant liquid.

4. The exhaust component according to claim 1, wherein the at least one gas inlet directs engine exhaust gases into the exhaust duct to form an engine exhaust gas passage.

5. The exhaust component according to claim 1, wherein the at least one flange delimits a plurality of exhaust gas inlets, and wherein the bearing surface comprises an engine abutment surface.

6. The exhaust component according to claim 1, wherein the exhaust duct defines a duct center axis, and wherein the hole defines a hole center axis that intersects the duct center axis.

7. The exhaust component according to claim 1, wherein the filler material initially comprises a solid material and wherein the solid material is subsequently melted to infiltrate between the flange and the end segment, into the hole, and between the end segment and the outer neck to secure the end segment, the flange, and the outer neck together.

8. The exhaust component according to claim 1, wherein the cannon, the outer neck and the end segment are tubular and are arranged substantially co-axially with respect to one another.

9. The exhaust component according to claim 1, wherein the cannon is arranged inside the end segment, and the end segment is arranged inside the outer neck.

10. The exhaust component according to claim 1, wherein the cannon and the outer neck do not have a hole in coincidence with the hole of the end segment.

11. The exhaust component according to claim 1, wherein the filler material is positioned inside the exhaust duct.

12. The exhaust component according to claim 11, wherein the filler material is positioned at an end of the cannon and spaced from the hole in the end segment such that when the filler material is subsequently melted, the filler material flows into the interstice between the cannon and the end segment and then through the hole, and then into the interstice between the end segment and the outer neck.

13. The exhaust component according to claim 1, wherein the end segment has a flared end, the outer neck bearing on the flared end.

14. The exhaust component according to claim 13, wherein the cannon includes a first segment extended by a second segment with a smaller thickness than the first segment, the cannon having a shoulder between the first and second segments, the flared end bearing on the shoulder.

15. The exhaust component according to claim 14, wherein the end segment, the second segment, and the outer neck have substantially the same thickness.

16. The exhaust component according to claim 14, wherein radial spacing between the end segment and the second segment is comprised between 0.05 mm and 0.45 mm.

17. A method for manufacturing an exhaust component comprising at least one exhaust duct delimited by a wall comprising an end segment;

at least one flange having a bearing surface, the flange delimiting at least one exhaust gas inlet communicating with the exhaust duct, the exhaust gas inlet being delimited by a cannon connected to the flange, the cannon being attached to the end segment; and at least one outer neck attached to the end segment, wherein the end segment is arranged between the flange and the outer neck, the method including the following steps:

deforming the outer neck;

piercing a hole in the end segment;

positioning the exhaust gas inlet of the exhaust duct across from the flange;

providing an interstice between the cannon and the end segment that is tubular and separates the cannon from the end segment radially with respect to a central axis of the exhaust gas inlet;

providing an interstice between the end segment and the outer neck that is tubular and separates the cannon from the end segment radially with respect to a central axis of the exhaust gas inlet; and securing the flange, the end segment, and the outer neck by adding a filler material, wherein the filler material infiltrates between the flange and the end segment, in the hole, then enters the end segment and the outer neck by capillarity.

18. The method according to claim 17, wherein the at least one gas inlet directs engine exhaust gases into the exhaust duct to form an engine exhaust gas passage.

19. The method according to claim 17, wherein the at least one flange delimits a plurality of exhaust gas inlets, and wherein the bearing surface comprises an engine abutment surface.

20. The method according to claim 17, wherein the exhaust duct defines a center axis, and including piercing the hole in the end segment such that a hole center axis intersects the center axis.

21. The method according to claim 17, including
initially positioning the filler material adjacent an inner surface of the exhaust duct and the canon, and
melting the filler material to infiltrate between the flange and the end segment, into the hole, and between the end segment and the outer neck.

22. The method according to claim 17, including infiltrating the filler material between the flange and the end segment of the exhaust duct, through the hole, and in an interstice between the end segment and the outer neck.

23. The method according to claim 17, wherein the cannon, the outer neck and the end segment are tubular and are arranged substantially co-axially with respect to one another.

24. The method according to claim 17, including arranging the cannon inside the end segment, and arranging the end segment inside the outer neck.

25. The method according to claim 17, wherein the cannon and the outer neck do not have a hole in coincidence with the hole of the end segment.

26. The method according to claim 17, including arranging a heating mechanism inside the exhaust duct adjacent the end segment, positioning the filler material against an inner surface of a shoulder of the end segment and an end of the cannon, and heating the filler material with the heating mechanism to melt the filler material to enter the interstice between the cannon and the end segment.

27. The method according to claim 17 including forming a flared end on the end segment.

28. The method according to claim 27, wherein the flared end is pre-positioned on the outer neck.

29. The method according to claim 17, including positioning the filler material inside the exhaust duct.

30. The method according to claim 29, further including positioning the filler material at an end of the cannon and spaced from the hole in the end segment such that when the filler material is subsequently melted, the filler material first flows into the interstice between the cannon and the end segment, and then flows through the hole, and then flows into the interstice between the end segment and the outer neck.

* * * * *